United States Patent [19]

Grube

[11] 4,203,187

[45] May 20, 1980

[54] FASTENER APPLYING TOOL

[75] Inventor: William L. Grube, Lake Bluff, Ill.

[73] Assignee: MacLean-Fogg Company, Mundelein, Ill.

[21] Appl. No.: 915,721

[22] Filed: Jun. 15, 1978

[51] Int. Cl.² .............................................. B23Q 1/00
[52] U.S. Cl. ..................................... 29/283.5; 29/813
[58] Field of Search ....................... 29/283.5, 813, 809, 29/432.2; 227/121, 114, 116; 81/313

[56] References Cited

U.S. PATENT DOCUMENTS

| | | | |
|---|---|---|---|
| 2,878,556 | 3/1959 | Heidergott et al. | 29/809 |
| 3,101,528 | 8/1963 | Erdmann | 29/809 |
| 3,811,171 | 5/1974 | Grube | 29/809 |
| 3,942,235 | 3/1976 | Goodsmith et al. | 29/813 |

FOREIGN PATENT DOCUMENTS 608213  1/1935  Fed. Rep. of Germany ............. 81/313

*Primary Examiner*—James L. Jones, Jr.

*Attorney, Agent, or Firm*—Mason, Kolehmainen, Rathburn & Wyss

[57] ABSTRACT

A tool for applying fasteners to a workpiece includes a housing and a punch reciprocally mounted in the housing. The punch includes an elongated slot through which a feed plate that is slideably mounted within the housing passes. A cam stop member is rotatably and slideably mounted in the housing and biased to engage the punch. The punch includes a first surface to rotate the cam such that a punch engaging edge is positioned against the punch. A second surface is defined on the punch at a predetermined distance spaced from the first surface and is engaged by the edge of the cam at an incomplete stroke of the punch. A third surface on the punch is spaced a predetermined distance from the second surface. The third surface rotates the punch engaging surface of the cam away from the punch at the completion of a full stroke allowing return of the punch to its normal position.

20 Claims, 13 Drawing Figures

FASTENER APPLYING TOOL

BACKGROUND OF THE INVENTION

A. Field of the Invention

The device of the present invention relates to a new and improved tool for applying fasteners such as pierce nuts to a workpiece.

B. Description of the Prior Art

In the manufacturer of automobiles and similar vehicles, it is desirable to secure a fastener to the sheet metal such as employed in the body of the vehicle in a manner such that the fastener will not become loose due to vibration during the operation of the vehicle. In the prior art, a fastener such as a pierce nut is used to pierce an opening in the sheet metal and is then deformed to clinch the fastener in place on the sheet metal in the opening, thus simultaneously forming the opening, locating the nut properly over the opening and securing the fastener to the sheet metal.

Typically, the prior art tools employed to secure fasteners such as pierce nuts to sheet metal include a punch reciprocally mounted within a housing for engaging a strip of fasteners such as pierce nuts. The stroke of the punch is such that at a point during a stroke it engages one of the nuts on the strip, severes the nut from the strip and forces it into a nose assembly of the tool that is aligned with the workpiece. After a sufficient number of fasteners have accumulated into the nose assembly, the lower fastener is then forced into the workpiece by the punch's engagement with the next fastener in the fastener strip.

The feeding of the strip into the drive track of the prior art punch is accomplished by a feed plate. To operate the feed plate, a separate plunger is reciprocally mounted within the housing of the prior art tool and mechanically coupled to the punch so as to move simultaneously therewith. The separate plunger is coupled to the feed plate in a manner such that the vertical reciprocation of the second plunger imparts horizontal reciprocation to the feed plate. A separate feed pawl is connected to the feed plate and engages the fastener strip to advance the strip of fasteners. The plunger is coupled to the punch so as to be simultaneously reciprocated with the punch. If, however, at anytime the punch and plunger are moved out of parallel alignment with each other, binding will occur requiring adjustment or resulting in destruction of the tool. It has been typical with prior art tools of this type for the punch and plunger to become out of parallel alignment quite often during operation resulting in substantial costs and down time.

As is typical with tools of this type, there may be a jamming of fasteners in the drive track of the punch. If the tool is allowed to continue to operate, the punch will engage the jammed fasteners, thus destroying tool or parts thereof. Accordingly, it is desirable to prevent operation of the tool once jamming occurs. In one prior art tool this is accomplished through the employment of a strip stop member that is pivotally mounted in the housing of the tool and is biased into engagement with the punch. The strip stop member is moved out of the track of the punch upon engagement with a fastener being advanced into the drive track. After a fastener has been driven, if there is no jamming, the strip stop member pivots to its original position out of engagement with the punch, allowing the complete withdrawal of the punch. If there is an incomplete stroke of the punch or there is a jam in the feed track by a fastener, however, the strip stop member engages the fastener and cannot return to its original position. The strip stop member in this condition continues to engage the punch and prevents a complete withdrawal and further operation of the tool.

Examples of the typical prior art tools are described in U.S. Pat. Nos. 3,718,965; 3,811,171; 3,969,808; 3,969,809; and 3,971,116 and these patents are incorporated by reference for understanding the basic tool structure.

There are several different disadvantages with the typical prior art tools described. If a jam occurs, the operator of the tool can attempt to manually feed the nut strip into the tool since the feed path is not blocked which may damage the tool or result in injury to the operator. Also, the typical prior art tool requires several different parts. For example, the second plunger is necessary as are separate feed plate, pawl and strip stop member. This requires a large tool that is expensive to manufacture and assemble.

Another disadvantage of the typical prior art tool is that after a period of time, the punch becomes magnetized and fasteners tend to adhere to the punch through the magnetic effect. These fasteners are then pulled into a jamming position by the punch upon its retraction, resulting in damage to the tool.

SUMMARY OF THE INVENTION

An object of the present invention is to provide a new and improved tool for driving fasteners such as pierce nuts into a workpiece.

Another object of the present invention is to provide a new and improved tool for driving a fastener into a workpiece that is smaller and more economical than previous prior art tools.

A further object of the present invention is to provide a new and improved tool for driving fasteners such as pierce nuts into a workpiece that employs a feed plate that will strip a nut from the punch if it is magnetized.

Still another object of the present invention is to provide a new and improved tool for driving fasteners such as pierce nuts into a workpiece that includes a feed plate that has an integral fastener engaging surface for advancing a strip of fasteners into the tool.

A further object of the present invention is to provide a new and improved tool for applying fasteners such as pierce nuts to a workpiece that includes a punch stopping member for preventing the complete retraction of the punch of the tool if there is a jam due to fasteners.

The present invention is directed to a new and improved fastener driving tool for driving fasteners such as pierce nuts into a workpiece. The tool of the present invention includes a housing with a punch reciprocally mounted therein. The punch includes an elongated slot. A feed plate is slideably mounted in the housing and coupled to the punch to be moved thereby. The feed plate passes through the slot of the punch and serves to advance fasteners into drive track of the punch. By passing through the slot in the punch, the feed plate strips any loose fasteners that may adhere to the punch due to magnetic effect or otherwise.

A punch stopping cam member is rotatably and slideably mounted within the housing and includes a stop surface for engaging the punch and preventing the punch from retracting to its normal inoperative position. The cam member is biased into engagement with the punch by a spring. The punch includes a first cam surface for engaging the cam and rotating the punching stopping surface into engagement with the punch during the downward movement of the punch prior to engagement of the punch with a fastener. The punch also includes a second surface spaced a predetermined distance from the first surface and adapted to engage the punch stopping surface of the cam at an incomplete stroke of the punch.

The punch further includes a third camming surface for engaging the cam at the completion of a full stroke and rotating the cam such that the punch stopping surface is moved out of engagement with the punch, allowing full retraction of the punch.

BRIEF DESCRIPTIONS OF THE DRAWINGS

The above and other objects and disadvantages and novel features of the present invention will become apparent from the following detailed description of the preferred embodiment of the invention illustrated in the accompanying drawings wherein:

FIG. 6 is a view taken along line 6—6 of FIG. 2;

DESCRIPTION OF A PREFERRED EMBODIMENT

Figures 1, 5:
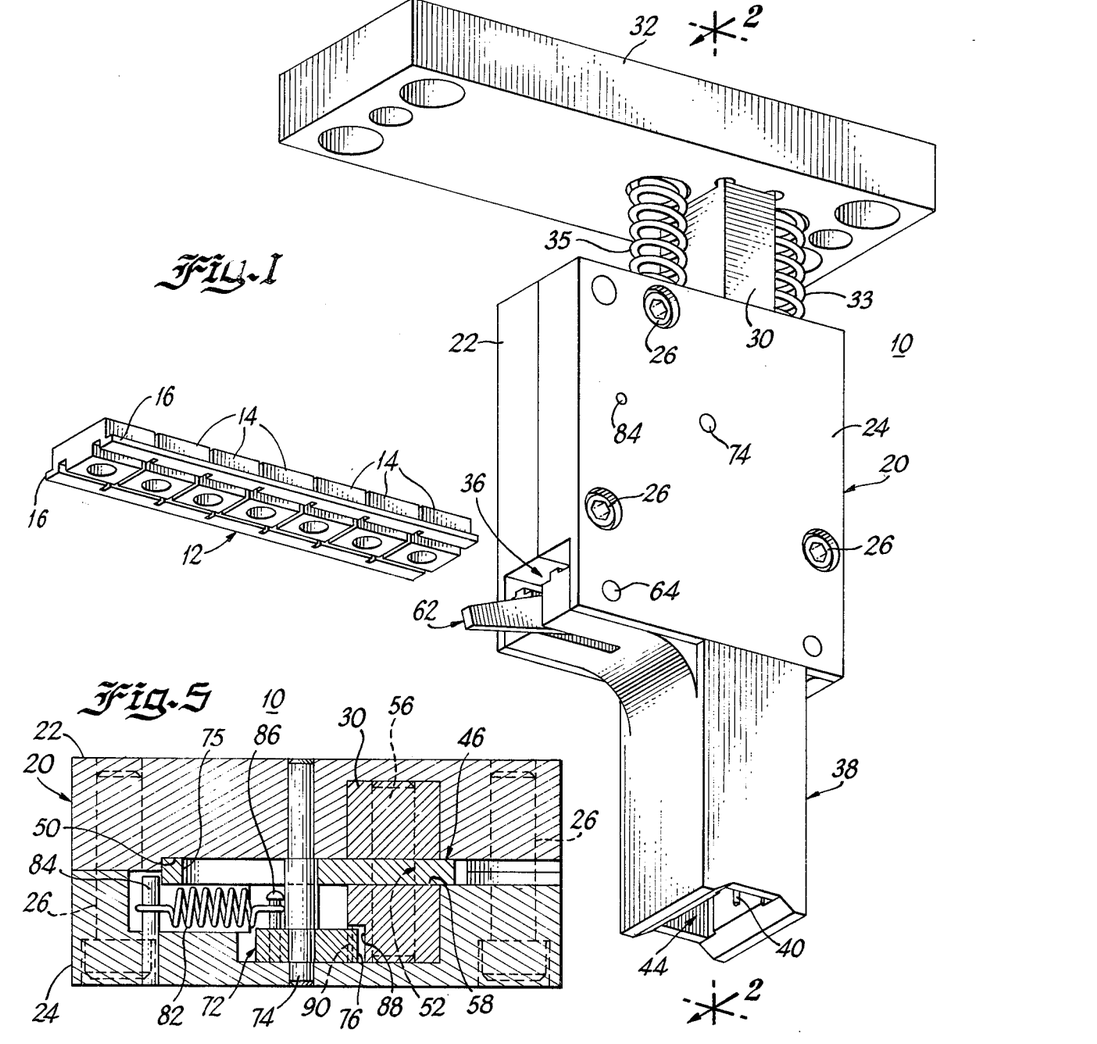
FIG. 1 is a perspective view of the tool constructed in accordance with the principles of the present invention.
FIG. 5 is a view taken along line 5—5 of FIG. 2.

Having reference now to the drawings and initially to FIG. 1, there is illustrated a new and improved tool generally designated by the reference numeral 10 that may be employed for applying fasteners from a strip such as a strip of pierce nuts generally designated by the reference numeral 12. The strip 12 includes individual pierce nuts 14 that are joined in a strip by the rails 16. The tool 10 applies each pierce nut 14 to a workpiece such as the sheet metal 18 in a manner well known in the art.

Figures 2, 3:
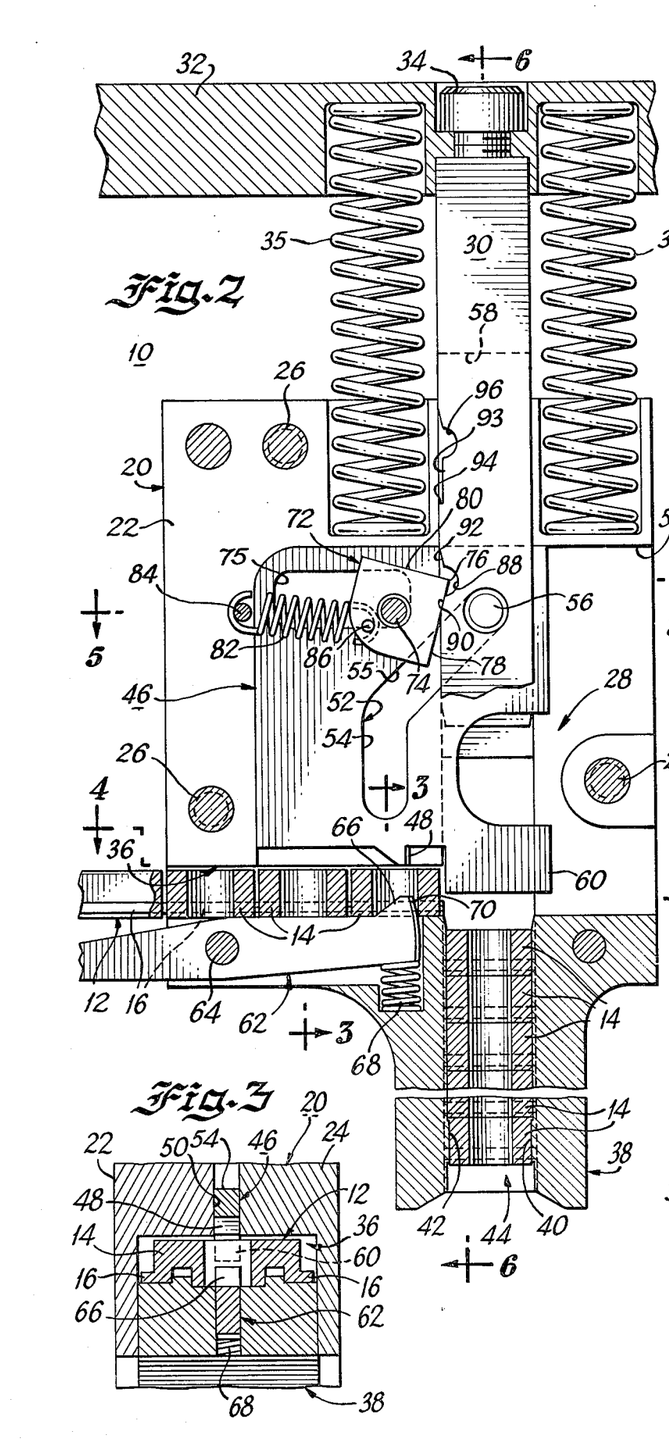
FIG. 2 is an enlarged view taken along line 2—2 of FIG. 1.
FIG. 3 is a view taken along line 3—3 of FIG. 2.
Figure 4:
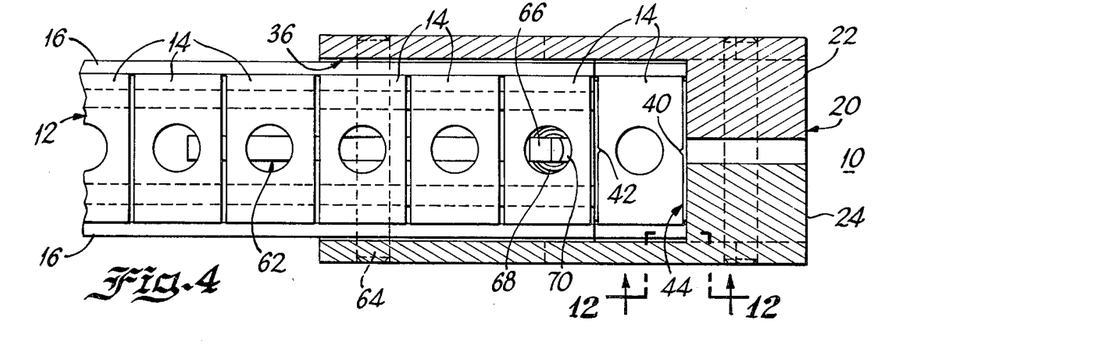
FIG. 4 is a view taken along line 4—4 of FIG. 2.
Figure 5:
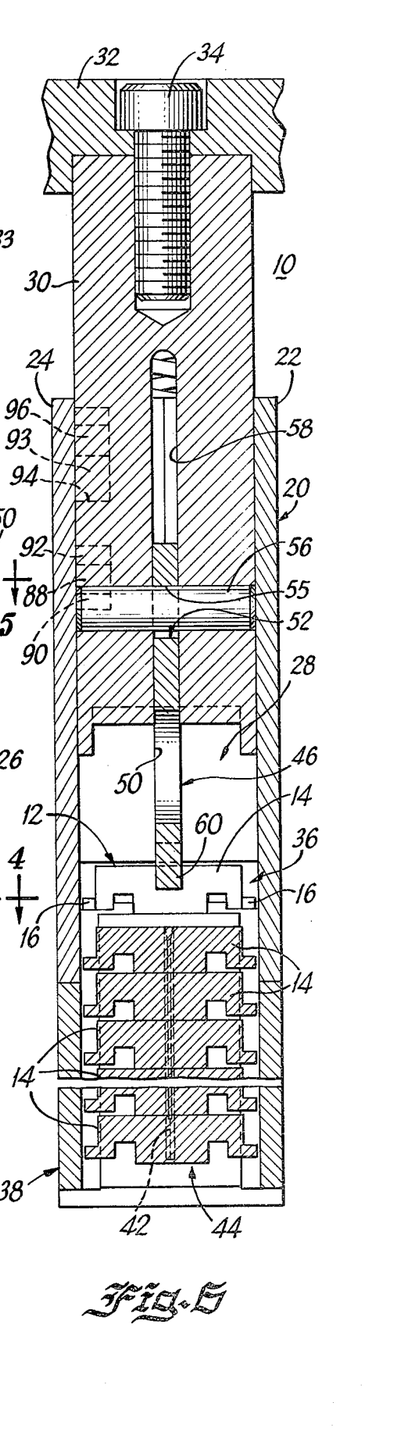

The tool 10 includes a housing generally designated by the reference numeral 20 defined by first 22 and second 24 housing portions joined together by fasteners 26. The housing portions 22 and 24 define a drive track 28 (FIG. 2) within which a fastener engaging plunger 30 is reciprocated. The plunger 30 is secured to a mounting plate 32 by a fastener 34. A press or similar machine (not shown) may be secured to the plate 32 for operating the tool 10. Springs 33 and 35 are mounted onto the housing 20 and bias the plate 32 upwardly away from the housing 20 thus biasing the plunger to a normal, inoperative position (FIG. 2). The housing portions 22 and 24 also define a feed path 36 into which the strip of fasteners 12 may be fed to the drive track 28 for engagement by the plunger 30.

Figures 10, 11, 12, 13:
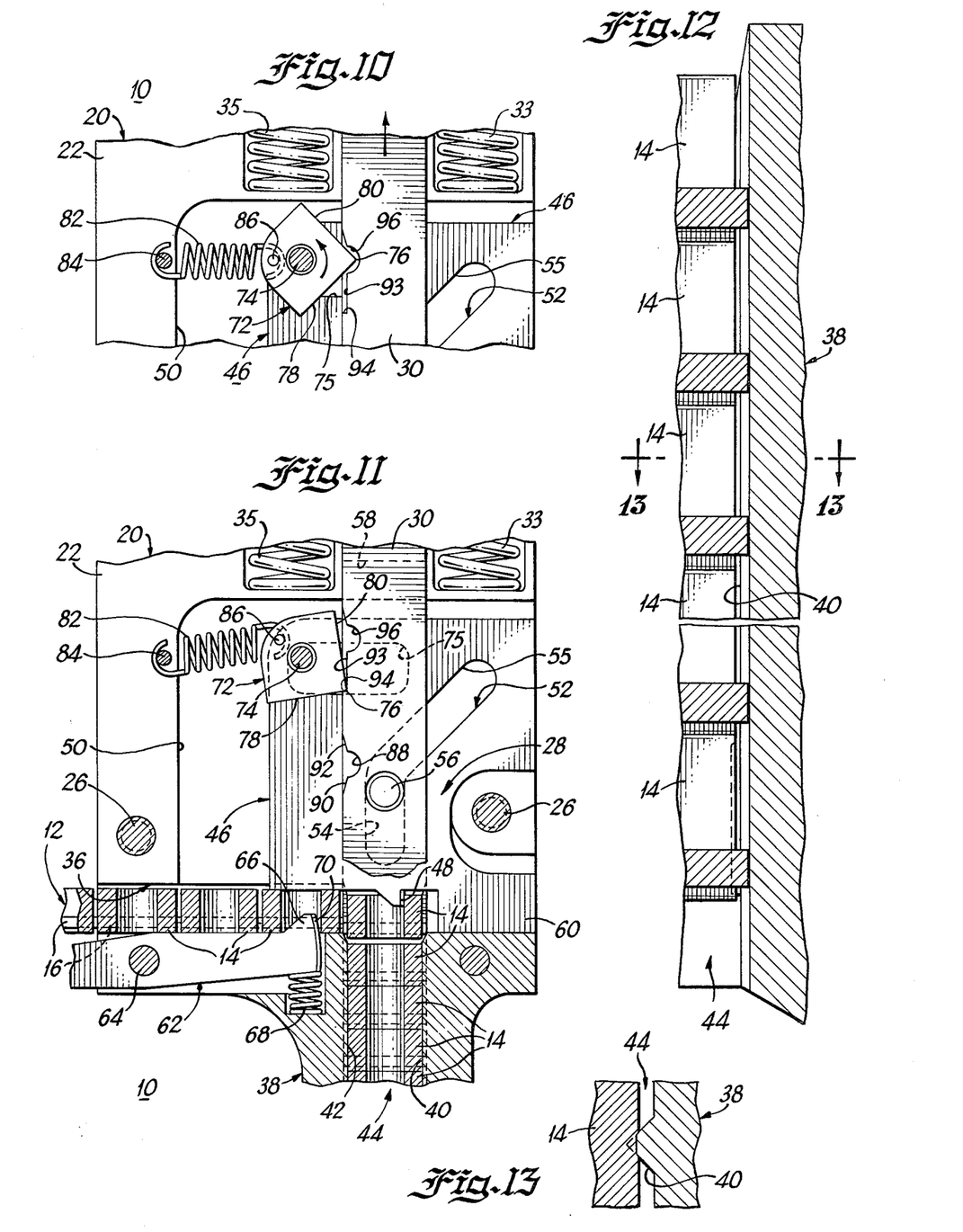
FIG. 10 is a fragmentary view of the punch and locking cam at the completion of a full downward stroke of the punch.
FIG. 11 is a fragmentary view of the punch and locking cam in the punch locking position.
FIG. 12 is a view taken along line 12—12 of FIG. 4.
FIG. 13 is a view taken along line 13—13 of FIG. 12.

Secured to the lower portion of the housing 20 and defining the lower portion of the feed path 36 is a nose portion 38 that extends downwardly from the tool 10 and is intended to be placed on top of the sheet metal 18. During operation of the tool 10, successive pierce nuts 14 are positioned within the drive track 28 and engaged by the punch 30. This engagement severs the pierce nuts 14 from the strip 12 and drives them into the nose portion 38. The nose portion 38 includes ribs 40 and 42 on the inner peripheral surface that engage the outer peripheral surface of each pierce nuts 14 and tend to hold them securely within the nose portion 38 in the extension of the drive track 44 (FIGS. 12 and 13). Once the nose portion is filled with pierce nuts 14 (FIG. 2), the next pierce nut 14 severed from the strip 12 by the punch 30 is forced into the nose portion 40 by the punch 30 forcing the lower most pierce nut 14 into engagement with the workpiece 18 applying it into and clinching it to the sheet metal 18.

To advance individual pierce nuts 14 along the feed path 36 and into the drive track 28, the tool 10 includes a feed plate 46. The feed plate 46 includes an integral pawl portion 48 that engages the lead pierce nut 14 on the strip 12. The feed plate 46 is mounted within a recess 50 defined by the housing portions 22 and 24. The recess 50 is larger than the feed plate 46 to allow horizontal or transverse and vertical movement of the feed plate 46 relative to the punch 30. This bidirectional movement of the plate 46 allows the plate to advance a pierce nut 14 and to return over the strip 12 to allow the integral pawl 48 to engage the next nut 14. In the prior art a spring biased pawl with a cam is pivotally connected to the feed plate and the plate is allowed only restricted horizontal movement with the pawl pivoting vertically to engage subsequent nuts.

Figure 7:
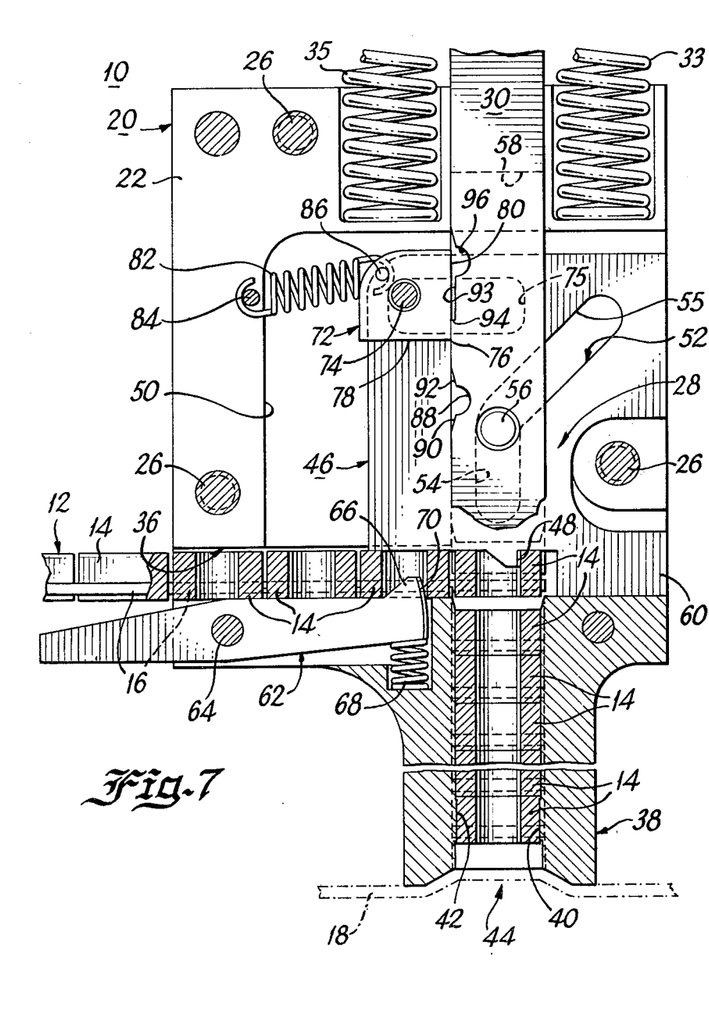
FIG. 7 is a vertical, cross-sectional view of the tool of the present invention during the stroke of the punch.

The feed plate 46 is mechanically coupled to the punch 30 such that as the punch 30 is driven downwardly to apply a pierce nut 14 to the workpiece 18, the feed plate 46 is moved transversely positioning a pierce nut 14 in the drive track 28 to be engaged by the punch 30 and severed from the strip 12. This mechanical coupling of the feed plate 46 and the punch 30 is accomplished by a slot generally designated by the reference numeral 52 defined in the feed plate 46 and a pin 56 on the punch 30. The slot 52 includes a generally vertical portion 54 that is substantially parallel to the punch 30. The slot 52 further includes an inclined portion 55 that is at an angle to the punch 30. The pin 56 extends into the slot 52 and engages the sides thereof. In the normal, at rest position of the tool 10, the pin 56 is positioned in the inclined portion 55 of the slot 52 (FIG. 2). As the punch 30 moves downwardly to engage a pierce nut 14, the pin 56 moves along the inclined portion 55 of the slot 52 and the feed plate 46 is moved transversely relative to the punch 30. The punch 30 includes an elongated passage 58 through which the feed plate 46 passes during the stroke of the punch 30 which advances the strip 12. Accordingly, once the pin 56 has traveled along the full length of the inclined portion 55 of the slot 52, the feed plate 46 has moved a sufficient distance through the passage 58 to position a pierce nut 14 in the drive track 28 beneath the punch 30 (FIG. 7). Thereafter, the punch 30 continues downward movement and the pin 56 travels along the vertical portion 54 of the slot 52 until the punch 30 engages the pierce nut 14 severing it from the strip 12 and moving it into the extension of the drive track 44 in the nose piece 38.

At the completion of the driving stroke of the punch 30, the springs 33 and 35 act to return the punch 30 to its original position. As this occurs, the pin 56 moves upwardly along the vertical portion 54 of the slot 52 and the feed plate 46 is not moved. Once the pin 56 commences its movement along the inclined portion 55 of the slot 52, the interaction of the pin 56 with the sides of the inclined portion 55 act to return the feed plate 46 to its original position.

The feed plate 46 includes a downwardly projecting or step portion 60 that extends from the feed plate 46 to a location to engage a pierce nut 14 located in the drive track 28. The downwardly projecting portion 60 serves a further novel purpose. It has been experienced in the prior art that the punch 30 over a period of time may become magnetized due to natural causes and it has often occurred in the prior art tools that the last pierce nut 14 to be severed by the punch 30 is attracted to the punch 30 by the magnetic effect and carried with the punch 30 as it returns to its normal position. If this occurs and the tool 10 is again operated, jamming occurs resulting in damage to the tool.

The portion 60 serves to overcome this problem experienced in the prior art. As the punch 30 returns to its normal position, the pin 56 begins its movement along the inclined portion 55 of the slot 52. As this occurs, the feed plate 46 is being returned to its original position and the depending portion 60 passes through the passage 58 in the punch 30. If a pierce nut 14 is adhering to the punch 30 due to magnetism or otherwise, the depending portion 60 will engage the pierce nut 14 forcing it off of the punch 30. If the removed pierce nut 14 falls back into its proper position within the nose portion 38, the depending 60 no longer engages the pierce nut 14 and continued upward movement of the punch 30 will return the feed plate 46 to its normal position. If, however, the pierce nut 14 does not fall to a proper position within the nose portion 38 but, rather, only partially returns and engages the edge of the drive track 44 extension in the nose portion 38, the downward projecting portion 60 will engage this misaligned pierce nut 14 preventing further retraction of the feed plate 46. Once this occurs, the pin 56 will bind on the edges of the inclined slope 55 preventing further retraction of the punch 30. The drive track 28 and feed path 36 will be blocked by the misaligned nut 14 and the portion 60 thus preventing the operator of the tool 10 from attempting to force the strip 12 into the drive track 28 under the mistaken assumption that the feed was not proper.

This action of the portion 60 is an important safety feature since in the prior art when a jam occurred, there is typically nothing blocking the access of the feed path to the drive track thus allowing the operator of the tool to force the strip of pierce nuts into the drive track and the tool can then be operated resulting in damage to the tool. In the tool 10, however, the portion 60 and the plunger 30 block the feed path 36 preventing manual insertion of the strip 12.

To prevent inadvertent retraction of the strip 12 of pierce nuts 14 during the feeding operation of the tool 10, a pawl 62 is pivotally mounted on the nose portion 38 by a pin 64. The pawl 62 includes a cam surface 66 that is biased into engagement with the leading pierce nut 14 by a spring 68. The cam surface 66 allows the individual pierce nuts 14 to be advanced in the feed path 36, but includes a vertical edge 70 that prevents retraction of the fastener strip 12 unless the pawl 62 is manually pivoted about the pin 64 against the bias of the spring 68.

It is desired that if the tool 10 becomes jammed preventing a complete downward stroke of the punch 30, the operation of the tool 10 will be terminated so that damage to the tool will not occur. In addition, it is also desirable that upon the occurrence of a jam due to an incomplete stroke of the punch 30, the feed path 36 is blocked so that the operator of the tool 10 may not manually force the strip 12 of pierce nuts 14 into the drive track 28 in an attempt to correct the jam. To accomplish these desired safety features, the tool 10 includes a cam or punch engaging member 72 rotatably mounted on the housing 20 by a pin 74. The cam 72 includes an edge 76 defined by sides 78 and 80. The side 78 in the normal position of the tool 10 is biased into the engagement with the punch 30 by a spring 82 that is connected to the housing 20 by a pin 84 and to the cam 72 by a pin 86. The pin 74 is mounted within a slot 75 defined on the feed plate 46 such that the plate 46 may be moved relative to the pin 74 and the cam 72.

Figure 8:
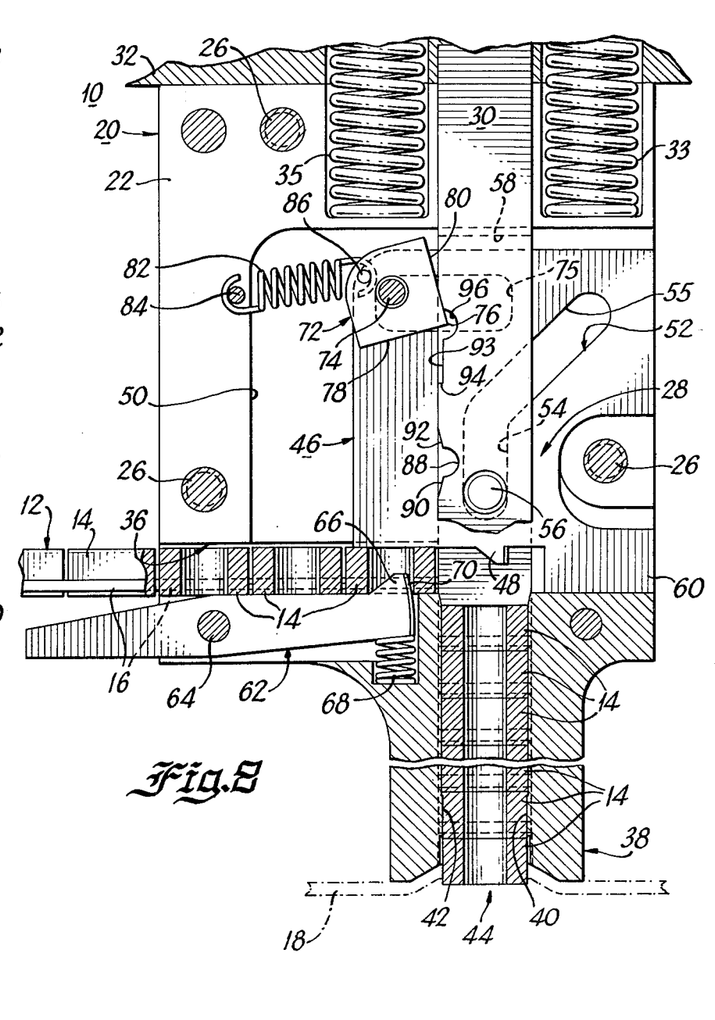
FIG. 8 is a vertical, cross-sectional view of the tool of the present invention at the completion of the downward stroke of the punch.
Figure 9:
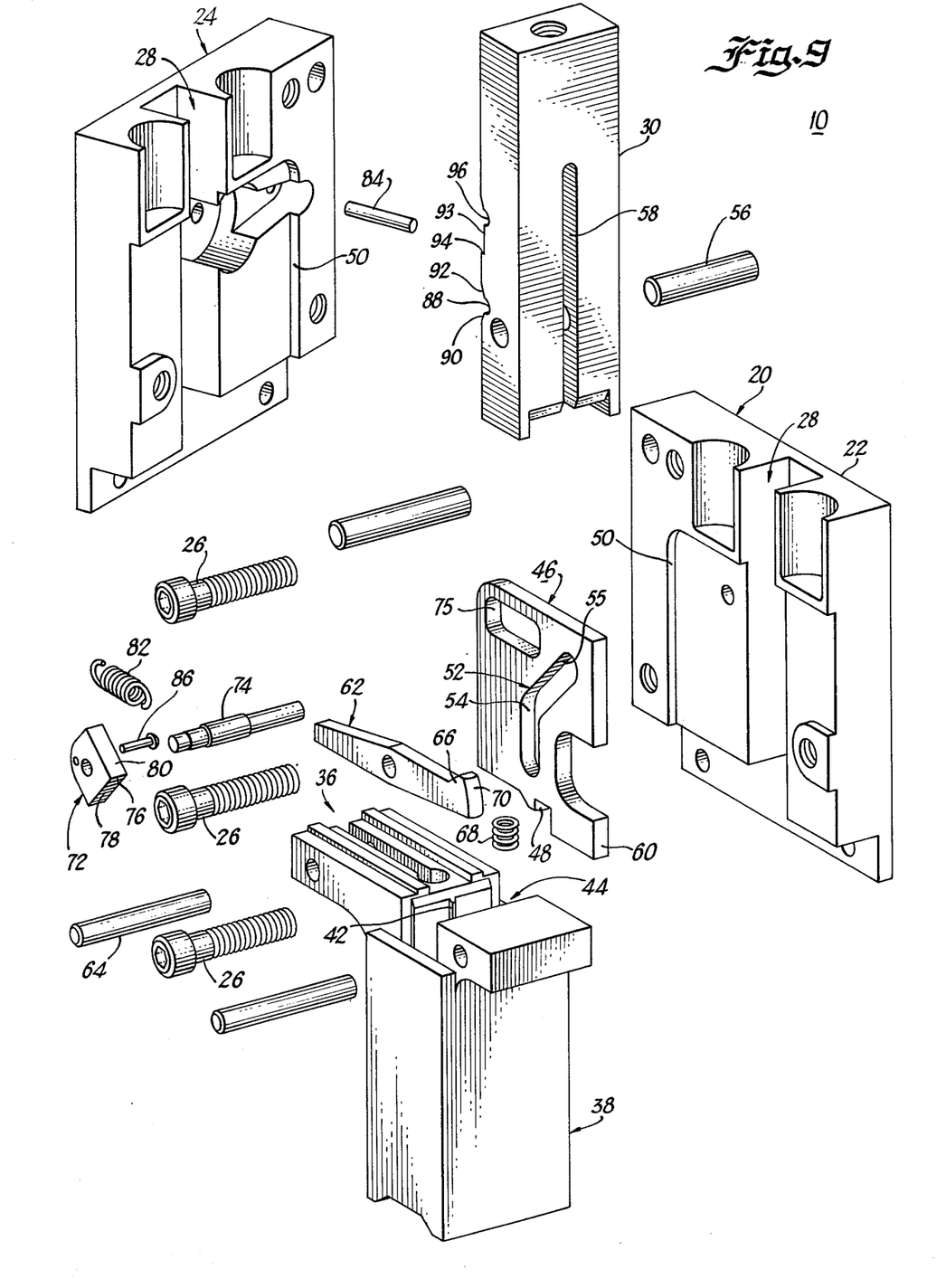
FIG. 9 is an exploded view of the tool of the present invention.

The punch 30 includes a first camming surface or recess 88 that includes a leading inclined edge 90 and a trailing inclined edge 92. During the downward stroke of the punch 30, the cam 72 engages inclined edge 90 and is pivoted such that the leading edge 76 is rotated into the recess portion or surface 88 (FIG. 8). Further downward reciprocation of the punch 30 causes the edge 76 to engage the trailing inclined edge 92 further pivoting the cam 72 such that the side 80 engages the side of the punch 30 allowing the punch 30 to continue its downward stroke.

The punch 30 also includes an indention 93 that defines a lower edge 94 that is vertically spaced from the recess or surface 88 a distance approximately equal to the engagement of the punch 30 with the rail 16 of the strip 12 and partial severance thereof. It is at the position that if the punch 30 were then retracted, the pierce nut 14 located in the drive track 28 may remain in a jamming position in the drive track 28 such that if the tool 10 were again operated, damage of the tool 10 could result. Accordingly, at this position of the punch 30, the edge 76 of the cam 72 engages the recessed portion 94 under the bias of the spring 82 (FIG. 11). Consequently, if the punch 30 is retracted, the engagement of the edge 76 with the edge 94 prevents further retraction of the punch 30. Moreover, in this position, the lower portion of the punch 30 is held in alignment with the feed path 36 preventing the operator of the tool 10 from manually forcing the strip 12 into the drive track 28.

If a jam does not occur and the punch 30 completes its full downward stroke, the edge 76 moves along the indention 93 until reaching a second recess or surface 96 (FIG. 10). The second recess or surface 96 is located at a predetermined distance from the recess 88 that is equal to a full downward stroke of the punch. As the punch 30 is retracted out the nose portion 38 to its original position, the surface or recess 96 functions to pivot the cam 72 counter clockwise about the pin 74 and against the bias of the spring 82 to a position such that the side 78 again engages the side of the punch 30. This action moves the edge 76 out of engagement with the edge 94 allowing complete retraction of the punch 30. If the punch 30 fails to engage the pierce nut 14 or only partially severs the pierce nut 14 from the strip 12 and is then retracted, the depending portion 60 of the feed plate 46 will engage the unsevered pierce nut in the drive track 28 thus preventing further retraction of the feed plate 46 and the punch 30 due to the engagement of the pin 56 on the sides of the inclined portion 55 of the slot 52.

The surfaces 88, 94 and 96 and the cam 72 also serve to assist the operator of the tool 10 during start up to adjust the press to insure a complete stroke of the punch 30. This is accomplished by incrementally adjusting the press to increase the downward stroke of the punch 30 until the edge 76 of the cam 72 engages the recess or surface 96 thus indicating to the operator of the tool 10 that the punch 30 is being actuated through its complete stroke. Thereafter, operation of the tool 10 may commence by the feeding of a strip 12 of pierce nuts 14 into the feed path 36.

The tool 10 described above is compact and simple in operation. More specifically, the tool 10 includes only one reciprocating element (the punch 30) as opposed to the prior art tools that employ a punch and a plunger for actuating a feed mechanism since the feed plate 46 is coupled to the punch 30. In addition, the feed plate 46 of the tool 10 provides the multiple functions of advancing the strip 12 of pierce nuts 14 by the integral pawl 48 and blocking the drive track 28 during a jam by the portion 60. In addition, the depending portion 60 serves to strip pierce nuts 14 that may adhere to the punch 30 by a magnetic effect. Furthermore, the surfaces 88, 94 and 96 of the punch 30 and the cam 72 allow adjustment of the tool 10 and prevent operation thereof during a jam while also preventing manually forcing of the strip 12 into the drive track 28 thus replacing the separate strip stop member employed in the prior art tools.

Obviously, many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. A tool for applying fasteners such as pierce nuts and the like into a workpiece comprising
   a housing,
   a punch reciprocally mounted in said housing for punching said fasteners from a strip into a workpiece, said punch including an elongated slot, and
   a feed plate slideably mounted in said housing for advancing said pierce nuts to be engaged by said punch, said plate passing through said slot to remove any fasteners adhering to said punch upon return of said punch from engagement with said fastener.

2. The tool claimed in claim 1 further comprising a punch stop member rotatably and slideably mounted on said housing, and means for biasing said stop member into engagement with said punch, said stop member including a stop edge.

3. The tool claimed in claim 2 wherein said punch includes a first means for engaging and holding said stop edge at a predetermined portion of the stroke of said punch equal to an incomplete stroke of said punch.

4. The tool claimed in claim 3 wherein said punch includes second means for rotating said stop member out of punch holding engagement with said stop member upon completion of a full stroke of said punch.

5. The tool claimed in claim 1 wherein said feed plate is mechanically coupled to said punch and actuated thereby.

6. The tool claimed in claim 1 wherein said feed plate includes an inclined slot, said punch includes a portion extending into said slot so as to be movable therealong to mechanically couple said punch to said feed plate.

7. A tool for applying fasteners to a workpiece comprising
   a housing defining a drive track and a fastener feed path,
   a plunger reciprocally mounted in said drive track,
   a feed plate for feeding said fasteners along said feed path into said drive track, said feed plate slideably mounted in said housing and mechanically coupled to said plunger whereby reciprocation of said plunger moves said feed plate to advance a fastener into said drive track, and
   a latching mechanism for engaging said plunger and holding said plunger in said drive track to block said feed path upon an incomplete stroke of said plunger, said latching mechanism includes a cam including a cam surface and a latching surface, means for biasing said cam into engagement with said plunger,
   said plunger includes a first surface for engaging said cam surface upon a downward stroke of said plunger to rotate said cam until said latching surface engages said plunger,
   said plunger includes a second surface for engaging and being held by said latching surface upon an incomplete stroke of said plunger.

8. The tool claimed in claim 7 said plunger further comprising a third surface for rotating said cam to move said latching surface out of engagement with said plunger upon a full stroke of said plunger.

9. The tool claimed in claim 7 wherein said plunger includes an elongated slot, said feed plate passing through said slot during a stroke of said plunger to remove any fasteners adhering to said plunger after engagement thereby.

10. A tool for applying fasteners such as pierce nuts and the like from a strip to a workpiece comprising
    a body defining a drive track and a feedway for said strip of fasteners,
    a punch reciprocally mounted in said track for engaging a fastener,
    a fastener feed member movably mounted in said housing for advancing a fastener into said drive track for engagement by said punch, said feed member including a surface for engaging said strip of fasteners,
    and a latching mechanism rotatably mounted in said housing for preventing the return of said punch after an incomplete fastener engaging stroke of said punch, means for biasing said latching mechanism into engagement with said punch, said punch including means for engaging said latching means and preventing reciprocation upon an incomplete fastener engaging stroke and further including means for engaging said latching mechanism to rotate it out of locking engagement with said punch after a complete fastener engaging stroke to allow return of said punch.

11. The tool set forth in claim 10 wherein said punch includes means defining a passage therethrough, said feed member coupled to said punch, said feed member moved transversely relative to said punch and through said passage means to advance a fastener into said drive track by the downward stroke of said punch.

12. The tool set forth in claim 10 wherein said latching mechanism comprises a cam including a first cam surface and punch latching surface.

13. The tool set forth in claim 12 wherein said punch includes a first surface adapted for engaging said first cam surface and rotating said cam such that said punch latching surface engages said punch.

14. The tool set forth in claim 13 wherein said punch includes a second surface for engaging said punch latching surface on said cam, said second surface spaced from said first surface on said punch a predetermined distance equivalent to an incomplete stroke of said punch.

15. The tool set forth in claim 12 wherein said means for engaging said latching mechanism comprises a third surface adapted for engaging said latching surface and operating said cam to move said punch latching surface out of engagement with said punch allowing return of said punch.

16. The tool set forth in claim 15 wherein said third surface is spaced from said first surface a predetermined distance equivalent to a full stroke of said punch.

17. The tool set forth in claim 11 wherein said feed plate includes means for coupling said feed plate to said plunger, said coupling means preventing reciprocation of said plunger after driving a fastener upon engagement of said feed plate with a fastener in said drive track.

18. A tool for applying fasteners such as pierce nuts to a workpiece comprising a housing defining a drive track and a feed path for said fasteners, a punch reciprocally mounted in said drive track, and a feed plate mounted in said housing and coupled to said punch for movement thereby, said feed plate including an integral feed pawl for engaging and advancing said fasteners, said feed plate being mounted on said punch and said housing to allow transverse and vertical movement relative to said housing whereby said pawl engages a fastener, advances said fastener into said drive track and returns after said fastener is driven by said punch.

19. The tool claimed in claim 18 wherein said punch includes a passage, said feed plate moves through said passage during advancement of said fasteners and through which said plate returns after engagement of said punch with said fastener.

20. The tool claimed in claim 19 wherein said feed plate includes a downwardly extending step portion for engaging any fasteners adhering to said punch during the return of said plate and said punch.

* * * * *